(12) United States Patent
Yeh

(10) Patent No.: US 7,654,877 B2
(45) Date of Patent: *Feb. 2, 2010

(54) DECORATIVE SLIDER WITH WEAR RESISTANCE

(76) Inventor: Tzong In Yeh, 4566 Crestwood St., Fremont, CA (US) 94538

( * ) Notice: Subject to any disclaimer, the term of this patent is extended or adjusted under 35 U.S.C. 154(b) by 0 days.

This patent is subject to a terminal disclaimer.

(21) Appl. No.: 12/068,989

(22) Filed: Feb. 14, 2008

(65) Prior Publication Data

US 2008/0166539 A1    Jul. 10, 2008

Related U.S. Application Data

(63) Continuation-in-part of application No. 10/797,094, filed on Mar. 11, 2004, now Pat. No. 6,988,920, which is a continuation-in-part of application No. 10/386,634, filed on Mar. 13, 2003, now Pat. No. 6,955,576.

(51) Int. Cl.
    *B63B 1/00*      (2006.01)
(52) U.S. Cl. .......................... 441/65; 441/74
(58) Field of Classification Search ................. 114/357; 441/65, 74
See application file for complete search history.

(56) References Cited

U.S. PATENT DOCUMENTS

| | | | |
|---|---|---|---|
| 4,752,260 A | 6/1988 | Stewart | |
| 5,211,593 A | 5/1993 | Schneider et al. | |
| 5,224,890 A | 7/1993 | Moran | |
| 5,647,784 A | 7/1997 | Moran | |
| 5,797,779 A | 8/1998 | Stewart | |
| 5,928,045 A | 7/1999 | Szabad | |
| 7,029,349 B2* | 4/2006 | Lin | 441/65 |
| 7,083,486 B2* | 8/2006 | Yeh | 441/65 |
| 7,160,164 B2* | 1/2007 | Lin | 441/65 |
| 7,172,481 B2* | 2/2007 | Yeh | 441/65 |
| 7,326,094 B2* | 2/2008 | Yeh | 441/65 |
| 7,491,105 B2* | 2/2009 | Yeh | 441/65 |

* cited by examiner

*Primary Examiner*—Lars A Olson
(74) *Attorney, Agent, or Firm*—Rosenberg Klein & Lee

(57) ABSTRACT

A slider includes a foam core, a first foam skin, a second foam skin, a plurality of third foam skins, a patterned laminate and a plastic board. The foam core is encased by the first, second and third foam skins. Specifically, the first foam skin is laminated to a top, a front edge and a rear edge of the foam core. The second foam skin is laminated to a bottom of the foam core. The third foam skins are laminated to side edges of the foam core respectively. The patterned laminate includes an outer plastic film, an inner plastic film and a pattern. The inner plastic film is laminated to a top of the first foam skin. The pattern is laminated between the inner and outer plastic films and is visible from outside of the outer plastic film. In addition, the plastic board is laminated to a bottom of the second foam skin.

12 Claims, 5 Drawing Sheets

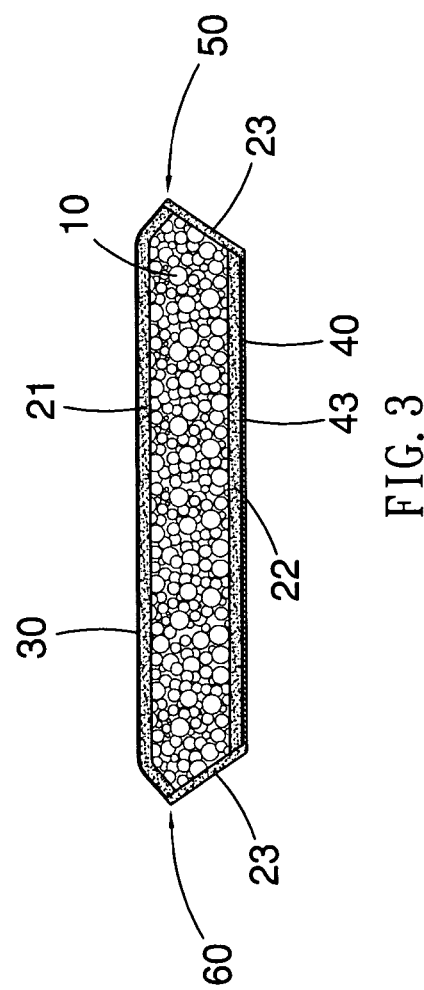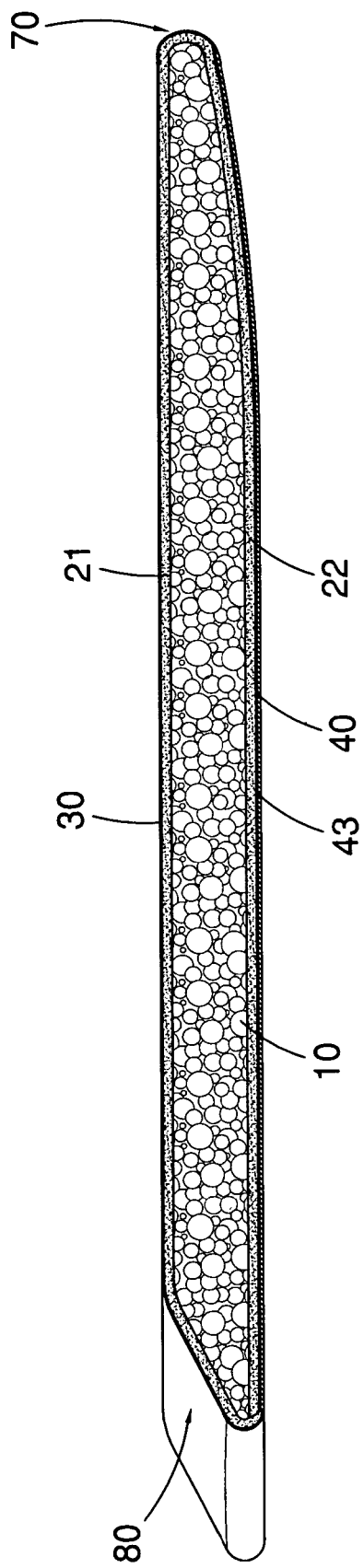

DECORATIVE SLIDER WITH WEAR RESISTANCE

CROSS REFERENCE TO RELATED APPLICATION

This application is a continuation-in-part of Ser. No. 10/797,094 filed Mar. 11, 2004 now U.S. Pat. No. 6,988,920, which is a continuation-in-part of the Ser. No. 10/386,634 filed Mar. 13, 2003 now U.S. Pat. No. 6,955,576.

BACKGROUND OF INVENTION

1. Field of Invention

This invention relates generally to a slider, used for sliding on snow, grass, sand or the like. The slider is a foam board to which layers are laminated to protect against erosion, wear and ultraviolet light. In the context of this specification, the slider is anyone of the embodiments. The slider is a bodyboard, a snow board, a snow sled, a grass sliding board, sand sliding board, surfing board or the like.

2. Related Prior Art

A slider of the prior art is a board made of plastic that has handles attached on the surface of the board and has a design printed in a central area of the board. The plastic is typically a hard plastic in order that the board could be wear resistant. However, the solid plastic board is generally not comfortable for the user and the board is also heavy for the users, especially children to carry. Besides, the design simply printed on the surface of the board is easily worn off due to the frequent contact with the user.

Another slider of the prior art is a board made of expanded foam. An outer film is generally laminated to a top surface of the foam board and several strips are laminated to edges of the foam board. The slider made of foam is more comfortable for the users to contact with and is lighter for the users to carry with than a slider made of solid plastic. However, it is known that the ultraviolet damages of expanded foam; furthermore, the outer film and the strip also degrade under the sunshine after a period of time. Air-cells of the foam board fracture when abraded. Once the air-cells are broken, water retains in the open cells and erosion reduces the life of the slider. Furthermore, the design of a slider mostly is printed on the outer film and the strips; therefore, the design on the board deteriorates very quickly.

The designs or patterns on the sliders are convenient means for the owners to identify their sliders. Therefore, an enduring pattern of the slider performs a useful and decorative function.

SUMMARY OF INVENTION

It is a primary object of the invention to provide a slider whose surfaces resist accelerated erosion due to moisture, dirt and ultraviolet sunlight.

It is another object of the invention that a pattern imprinted on the slider resists wear and tear.

Another object of the invention is that the slider is comfortable to the touch.

In one embodiment, a slider of the invention includes a foam core, first foam skin, a second foam skin, a plurality of third foam skins, a patterned laminate and a plastic board. The foam core is encased by the first, second and third foam skins. Specifically, the first foam skin is laminated to a top, a front edge and a rear edge of the foam core. The second foam skin is laminated to a bottom of the foam core. The third foam skins are laminated to side edges of the foam core respectively. The patterned laminate includes an outer plastic film, an inner plastic film and a pattern. The inner plastic film is laminated to a top of the first foam skin. The pattern is laminated between the inner and outer plastic films and is visible from outside of the outer plastic film. In addition, the plastic board is laminated to a bottom of the second foam skin.

In another embodiment, a slider of the invention includes a foam core, a first foam skin, a second foam skin, a patterned laminate and a plastic board. The foam core is encased by the first and second foam skins. Specifically, the first foam skin is laminated to a top, a front edge, a rear edge and upper side edges of the foam core. The second foam skin is laminated to a bottom and lower side edges of the foam core. The patterned laminate includes an outer plastic film, an inner plastic film and a pattern. The inner plastic film is laminated to a top of the first foam skin. The pattern is laminated between the inner and outer plastic films and is visible from outside of the outer plastic film. In addition, the plastic board is laminated to a bottom of the second foam skin.

Other features of the invention include bonding medium that enables foam materials such as polystyrene or polypropylene to be adhesively bonded to polyethylene.

BRIEF DESCRIPTION OF DRAWINGS

The invention will be more clearly understood after referring to the following detailed description read in conjunction with the drawings wherein:

FIG. 3 is a transverse cross-section of the slider of FIG. 1;

FIG. 4 is a longitudinal cross-section of the slider of FIG. 1;

DETAILED DESCRIPTION OF PREFERRED EMBODIMENTS

Figure 1:
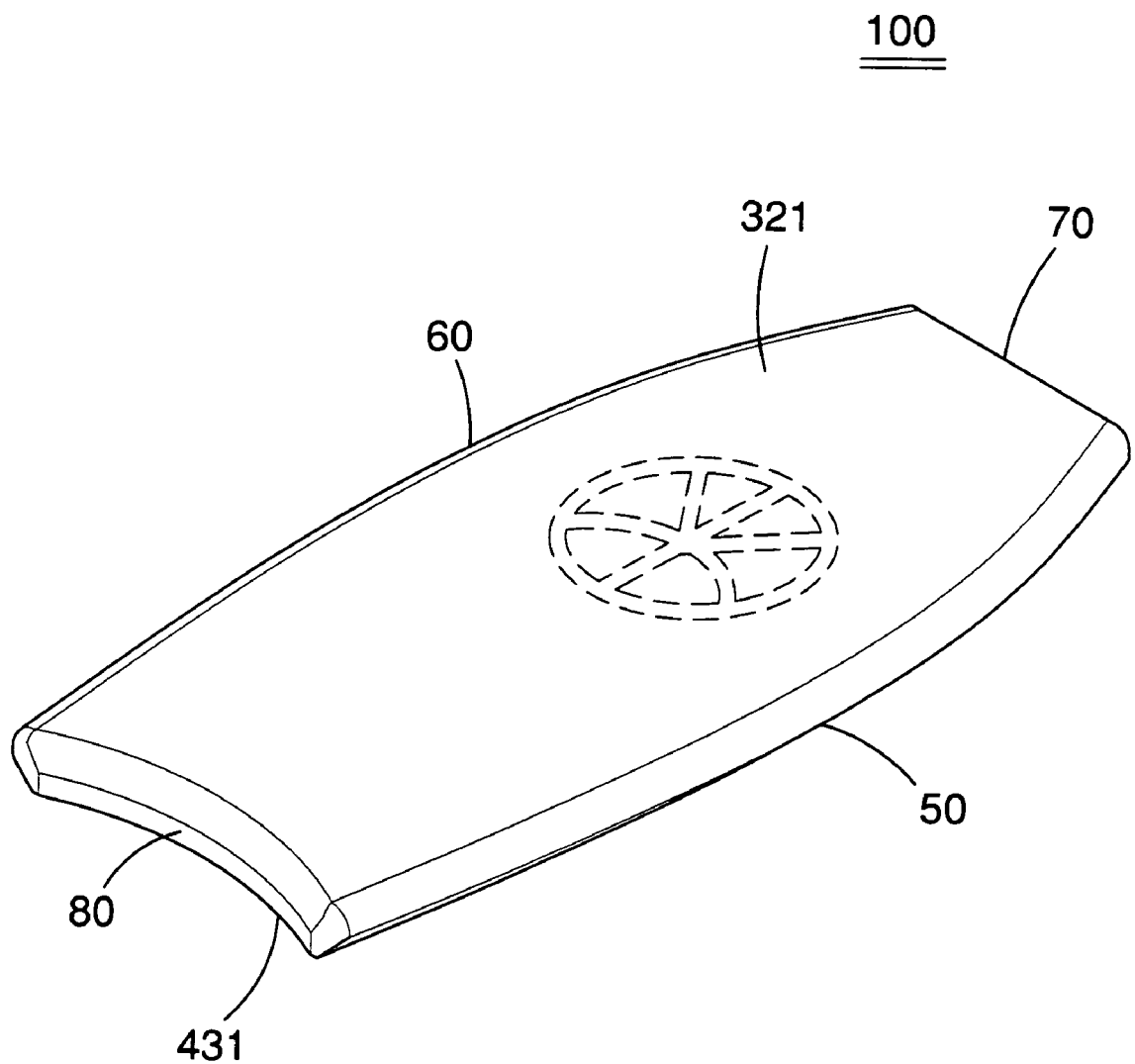
FIG. 1 is a perspective view of a slider in accordance with a first embodiment of the present invention.

With reference to FIGS. 1-6, a slider 100 according to a first embodiment of the present invention is an elongate, semi-rigid foam plank having a top surface 321 for supporting a rider and a bottom surface 431 for planning on water. Laterally opposed side edges 50, 60 extend from the front nose end 70 to the rear tail end 80 of the slider 100. The side edges 50, 60 are beveled. On left side 50, shown in cross-section in FIG. 5, an upper beveled edge 51 extending from the top surface 321 is provided, called a chine, and a lower beveled edge 52 is provided, called a rail. Similar upper and lower beveled edges (not shown) are formed on right side 60. In addition, a recess is formed in the tail end 80 of the slider 100 to create what is called a swallow tail. The swallow tail is also sometimes beveled. These beveled surfaces help direct the flow of water around the slider 100 as it travels in ocean surf.

Figure 2:
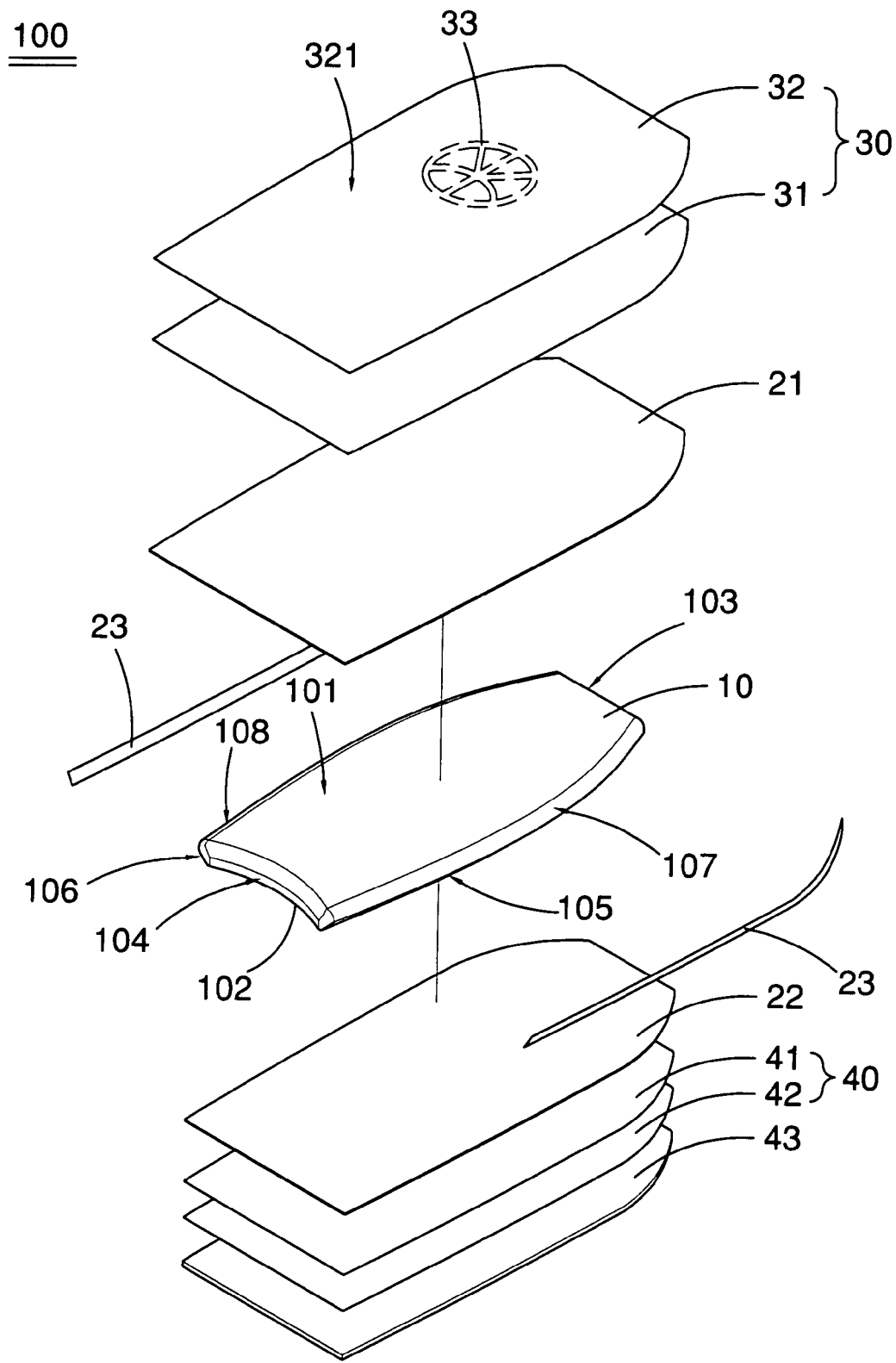
FIG. 2 is an exploded prospective view of the slider of FIG. 1.

Referring to FIG. 2, the slider 100 includes a foam core 10, a first foam skin 21, a second foam skin 22, a plurality of third foam skins 23, a first patterned laminate 30 and a plastic board including a second patterned laminate 40 and a plastic plate 43.

Figure 5:
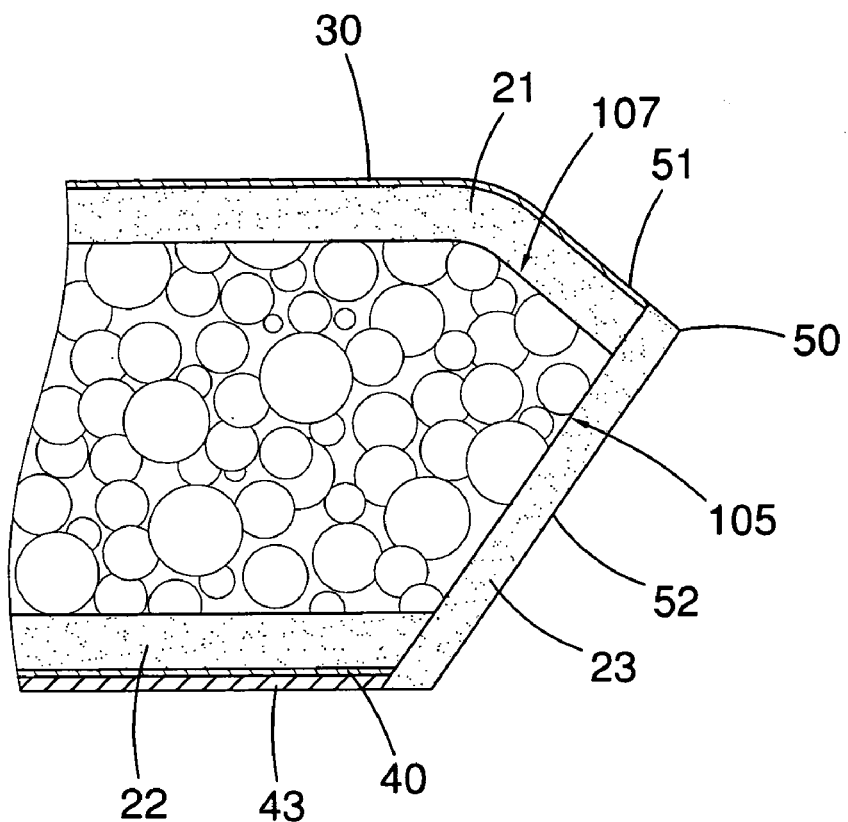
FIG. 5 is a regionally enlarged cross-section of the slider of FIG. 3.

At the core of the slider 200 is the foam core 10 made of polyethylene foam with a density in the range of 1.2 to 8 PCF (pounds per cubic foot) so the foam core 10 is light and flexible. FIGS. 3 and 4 show transverse and longitudinal cross-sectional views of the slider 100 respectively. In FIGS. 3 and 4, the foam core 10 is entirely encased by the first, second and third foam skins 21, 22, 23. Specifically, referring back to FIG. 2, the foam core 10 has a top, a bottom 102, a front edge 103, a rear edge 104 and side edges. The top of the foam core 10 includes a flat top 101, a left beveled top 107 and a right beveled top 108. The side edges include a left beveled side edge 105 and a right beveled side edge 106. As best seen in FIG. 5, the left side edge 105 has a width greater than that of the left top 107. Similar right side edge 106 and right top 108 (not shown) are formed on right side.

The first foam skin 21 is heat laminated to the top, front edge 103 and rear edge 104 of the foam core 10. The second foam skin 22 is heat laminated to the flat bottom 102 of the foam core 10. Laterally opposed third foam skins 23 are laminated to the beveled right and left side edges 105, 106 of the foam core 10 respectively. Additionally, the foam skins 21, 22, 23 are made of polyethylene foam and are directly heat laminated to the foam core 10 correspondingly without an intermediate element. Also, each of the polyethylene foam skins 21, 22, 23 has a density greater than that of the foam core 10 and is in the range of 1.5 to 10 PCF. Therefore, the foam skins 21, 22, 23 have smoother surfaces, which improve the interfacial bonding strength during the heat lamination between the foam core 10 and any of the foam skins 21, 22, 23 and also between the patterned laminate 30 and any of the foam skins 21, 22, 23.

In another example where the foam core 10 is made of non-polyethylene foam, such as polystyrene foam or polypropylene foam, and the foam skins 21, 22, 23 are made of polyethylene foam, the foam skins 21, 22, 23 are adhesively bonded to the foam core 10 via a bonding medium or an adhesive.

Referring again to FIG. 2, the first patterned laminate 30 includes an inner plastic film 31, an outer plastic film 32, and a pattern 33. The inner plastic film 31 has a top joined to the outer plastic film 32 and a bottom directly heat laminated to a top of said first foam skin 21. The pattern 33 may be printed on the top of the inner plastic film 31 or a bottom of the outer plastic film 32 in such a way that the pattern 33 is laminated between the inner and outer plastic films 31, 32. The pattern 33 is thereby protected from direct exposure to the outside of environment. In addition, the outer film 32 is made of a transparent material so the pattern 33 is visible from outside of the outer plastic film 32 or the slider 100.

Similar to the first patterned laminate 30, the opposed second patterned laminate 40 of the plastic board includes an inner plastic film 41 and an outer plastic film 42 and a pattern (not shown). The inner plastic film 41 is laminated to a bottom of the second foam skin 22. The outer plastic film 42 is joined to a bottom of the inner plastic film 41. The pattern is laminated between the inner and outer plastic films 41, 42. The plastic plate 43 of the plastic board which is thicker than the outer plastic film 42 is laminated to a bottom of the outer plastic film 42 to enhance wear resistance. In addition, the outer film 42 and the plastic plate 43 are made of transparent materials so the pattern of the second patterned laminate 40 is visible from outside of the plastic plate 43 or the slider 100 and is also protected from direct exposure to the outside of environment.

Figure 6:
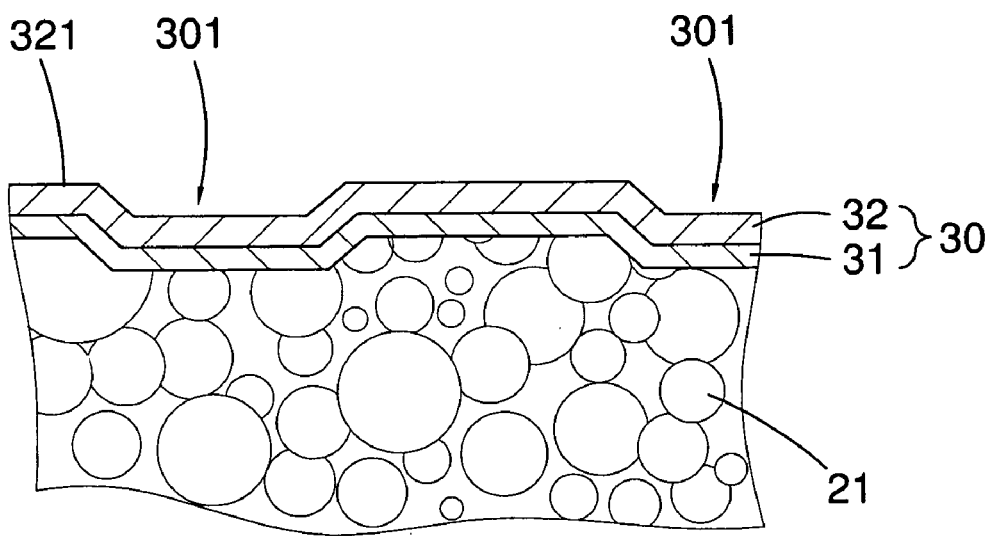
FIG. 6 is a further regionally enlarged cross-section of the slider of FIG. 5, showing an embossed surface thereof.

Referring to FIG. 6, the first patterned laminate 30 together with the first foam skin 21 is embossed to define a plurality of concaves 301 in the exterior surface 321 of the patterned laminate 30. In such a manner, the bonding strength between the patterned laminate 30 or 40 and the foam skin 21 or 22 is enhanced.

Furthermore, the concaves 301 enable the users to grab the slider 100 with greater tenacity.

As stated above, the foam core 10 as well as the patterns is protected from erosion by exposure to ultraviolet light, moisture and abrasion. Furthermore, the patterns are visible from outside of the slider 100 that attract the users' attentions.

Figure 7:
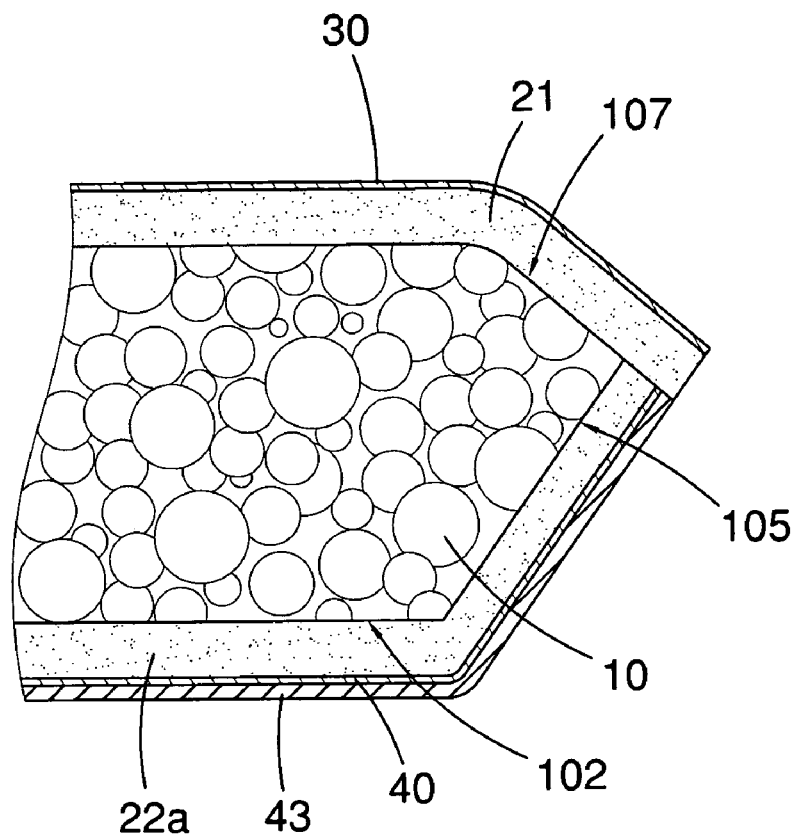
FIG. 7 is a cross sectional view of a slider in accordance with a second embodiment of the present invention.
Figure 8:
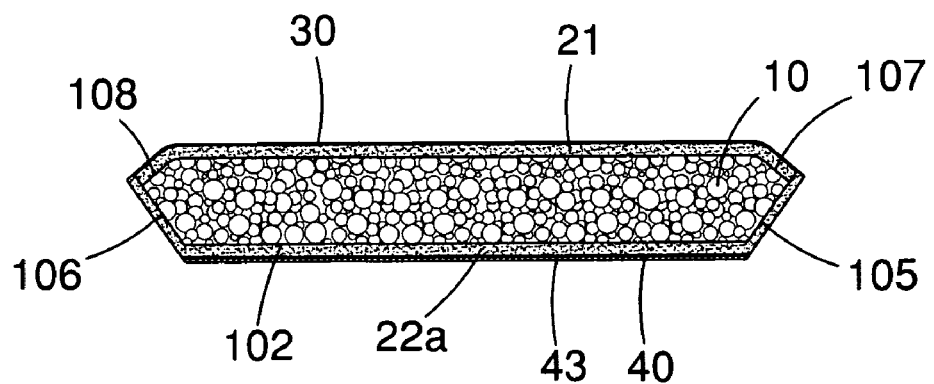
FIG. 8 is a transverse cross-section of the slider of FIG. 7.

With reference to FIGS. 7 and 8, a slider according to a second embodiment of the invention includes a foam core 10, a first foam skin 21, a second foam skin 22a, a first patterned laminate 30, a second patterned laminate 40 and a plastic plate 43, which are similar to those of the first embodiment. The foam core 10 has a flat top 101, a bottom 102, a front edge 103, a rear edge 104 and upper side edges and lower side edges. The upper side edges are a left beveled top 107 and a right beveled top 108. The lower side edges are a left beveled side edge 105 and a right beveled side edge 106. No third foam skins 23 are included in the second embodiment. The first foam skin 21 remains covering the flat top 101, the left beveled top 107 and the right beveled top 108 of the foam core 10. However, the second foam skin 22a extends around the left beveled side edge 105, the flat bottom 102 and the right beveled side edge 106 of the foam core 10. Thus, the foam core 10 of the second embodiment is encased by the first and second foam skins 21, 22a. As a result, the second embodiment having the foam core 10 encapsulated by the two foam skins 21, 22a has less seams when compared with the first embodiment.

The foregoing description is for purposes of illustration only and is not intended to limit the scope of the protection accorded this invention. The scope of protection is to be measured by the following claims, which should be interpreted as broadly as the inventive contribution permits.

The invention claimed is:

1. A slider comprising:
    a foam core having a top, a bottom, a front edge, a rear edge and side edges;
    a first foam skin laminated to said top, front edge and rear edge of said foam core;
    a second foam skin laminated to said bottom of said foam core;
    a plurality of third foam skins laminated to said side edges of said foam core respectively;
    a patterned laminate including an outer plastic film, an inner plastic film laminated to a top of said first foam skin, and a pattern laminated between said inner and outer plastic films, said pattern being visible from outside of said outer plastic film; and
    a plastic board laminated to a bottom of said second foam skin;
    wherein said foam core is encased by said first, second and third foam skins.

2. The slider of claim 1 wherein said foam core is a polyethylene foam board and said first, second and third foam skins made of the same polyethylene foam are directly heat bonded to said foam core with a density greater than that of said foam core.

3. The slider of claim 1 wherein said foam core is a non-polyethylene foam board and said first, second and third foam skins made of polyethylene foam are adhesively bonded to said foam core.

4. The slider of claim 1 wherein said patterned laminate together with said first foam skin is embossed to define a plurality of concaves in an exterior surface of said patterned laminate.

5. The slider of claim 1 wherein said plastic board includes an outer plastic film, an inner plastic film laminated to said bottom of said second foam skin, and a pattern laminated between said inner and outer plastic films, said pattern being visible from outside of said outer plastic film.

6. The slider of claim 5 wherein said plastic board further includes a plastic plate laminated to said outer plastic film, and said plastic plate is thicker than said outer plastic film.

7. A slider comprising:
- a foam core having a top, a bottom, a front edge, a rear edge, upper side edges and lower side edges;
- a first foam skin laminated to said top, front edge, rear edge and upper side edges of said foam core;
- a second foam skin laminated to said bottom and lower side edges of said foam core;
- a patterned laminate including an outer plastic film, an inner plastic film laminated to a top of said first foam skin, and a pattern laminated between said inner and outer plastic films, said pattern being visible from outside of said outer plastic film; and
- a plastic board laminated to a bottom of said second foam skin;
- wherein said foam core is encased by said first and second foam skins.

8. The slider of claim 7 wherein said foam core is a polyethylene foam board and said first and second foam skins made of the same polyethylene foam are directly heat bonded to said foam core with a density greater than that of said foam core.

9. The slider of claim 7 wherein said foam core is a non-polyethylene foam board and said first and second foam skins made of polyethylene foam are adhesively bonded to said foam core.

10. The slider of claim 7 wherein said patterned laminate together with said first foam skin is embossed to define a plurality of concaves in an exterior surface of said patterned laminate.

11. The slider of claim 7 wherein said plastic board includes an outer plastic film, an inner plastic film laminated to said bottom of said second foam skin, and a pattern laminated between said inner and outer plastic films, said pattern being visible from outside of said outer plastic film.

12. The slider of claim 11 wherein said plastic board further includes a plastic plate laminated to said outer plastic film, and said plastic plate is thicker than said outer plastic film.

* * * * *